April 8, 1969  A. E. EDELMAN  3,436,826
METHOD AND DEVICE FOR ATTACHING DENTAL APPLIANCES TO THE JAW
Filed May 3, 1967

INVENTOR
Alfred E. Edelman
BY Munson H. Lane
ATTORNEY

United States Patent Office 3,436,826
Patented Apr. 8, 1969

3,436,826
METHOD AND DEVICE FOR ATTACHING DENTAL APPLIANCES TO THE JAW
Alfred E. Edelman, 2723 Federal St., Camden, N.J. 08105
Filed May 3, 1967, Ser. No. 635,749
Int. Cl. A61c *13/00, 3/00;* B23b *43/00*
U.S. Cl. 32—10                                    12 Claims

ABSTRACT OF THE DISCLOSURE

An elongated pin for holding dentures, teeth or the like securely to the jaw and adapted to be inserted in a hole drilled transversely through the jaw bone, having a threaded bore formed transversely therein to receive a threaded fastener, and bearing portions on the ends thereof for engaging supporting surfaces on opposite legs of a drill jig frame and a drill jig for use in combination with the elongated pin to guide a drill in forming a hole through the jaw in axial alignment with the transverse bore in the pin, the drill jig having a support frame comprising a central web portion and a pair of leg portions bent from the ends of the web portion approximately perpendicular thereto, and a drill guide bushing mounted in the web portion of the support frame. The leg portions of the jig frame having aligned supporting surfaces thereon to engage the bearing portions of the elongated pin when the legs are spread apart enough to snap over the ends of the pin.

---

This invention relates to the retention of artificial dentures, individual teeth, both artificial or natural, or the like in the mouth of users in such a way that they are normally rigidly secured in the mouth, but can be removed if desired.

It is an object of this invention to provide a pin which can be inserted in a hole drilled transversely through a jaw bone of the user, the pin having a centrally located, threaded hole formed transversely therein to receive a threaded fastener which is inserted in a hole drilled in the jaw in axial alignment with the pin and to which is secured the denture, tooth or other device which is to be held in the mouth of the user.

It is another object of the invention to provide a drill jig which can be used in combination with the pin after the pin is implanted in the jaw to guide a drill in forming a hole through the jaw bone in accurate axial alignment with the centrally located hole in the pin.

It is another object of this invention to provide a drill jig having a frame of a shape to firmly engage opposite ends of the implanted pin and to bridge over the arch of the jaw bone, and a drill bushing mounted in the frame in a position which is in axial alignment with the central hole of the implanted pin when the jig frame is engaged over the ends of the pin.

It is another object of the invention to provide a pin of such shape so that it will not readily turn in the hole formed in the jaw bone of the user. The cross sectional shape to the pin may be semicircular, square, rectangular or of other shape or size so that it will not turn in the transverse hole formed in the users jaw.

It is another object of the invention to provide reduced end portions on opposite ends of the pin which are of a shape so that when engaged with apertures of corresponding shape in the jig frame will not permit rotation of the pin relative to the jig frame.

These and other objects, advantages and novel features will be apparent from the following descriptions and the accompanying drawing.

Figure 1:
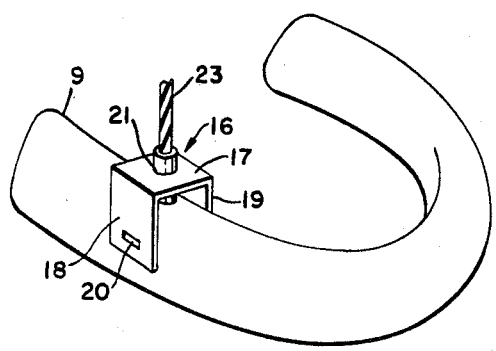
FIG. 1 is a vertical perspective view of the lower jaw arch of a user showing the drill jig of this invention in place.
Figure 2:
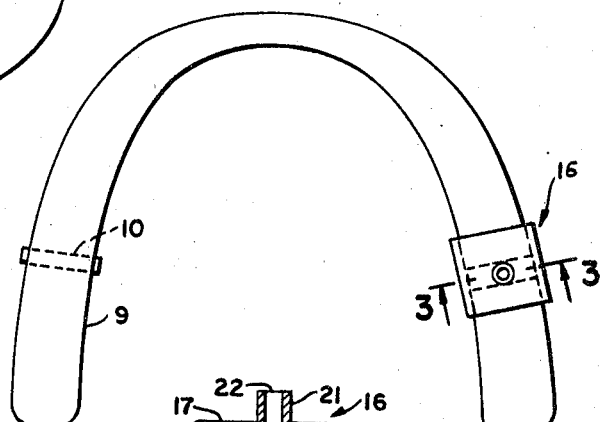
FIG. 2 is a plan view of the jaw arch of a user with the pin and drill jig of the invention in place.

In the drawing reference numeral 10 indicates an elongated pin of non-corrosive material that is used in anchoring a denture, an individual tooth, or other device in place in the mouth of a user. The pin is adapted to be firmly implanted in a hole 15 drilled transversely through the jaw bone 9 of the user after incisions have been made in the flesh convering the jaw bone and the flesh spread apart to expose the jaw bone where the pin is to be implanted.

Figure 3:
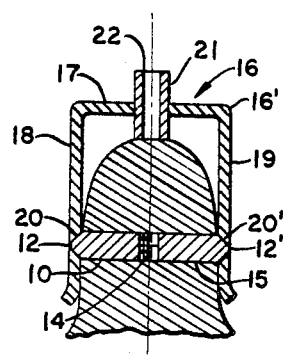
FIG. 3 is a vertical sectional view taken on line 3—3 of FIG. 2 through the lower jaw showing the pin and drill jig in place.
Figure 4:
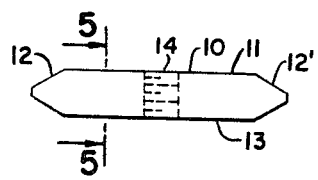
FIG. 4 is a side elevational view of the pin of this invention.

The pin 10 as best shown in FIGS. 3 and 4 has a main body portion 11, and reduced ends 12, 12'. The main body portion 11 has a uniform cross sectional area and is of a shape and length corresponding to the shape and length of the hole drilled 15 in the jaw bone 9. The reduced ends 12, 12' are short extensions of the main body portion 11 which project a short distance on opposite sides of the jaw bone 9 so that they can be inserted in receiving apertures in a drill jig frame subsequently to be described.

Figure 5:
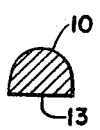
FIG. 5 is a vertical cross sectional view taken on line 5—5 of FIG. 4 through the pin of this invention.
Figures 6, 7:
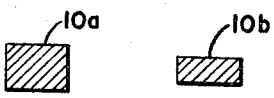
FIG. 6 is a similar view to FIG. 5 but showing a modification of the invention.
FIG. 7 is a similar view to FIG. 5 but showing still another modification of the invention.

The main body 11 of the pin 10 preferably has at least one flat side 13 which will lie against a similar flat side in the bone encompassing the hole 15 so that when implanted in the hole the pin 10 will be properly aligned in the hole and will not turn therein. The cross sectional shape of the pin 10 can be of a variety of forms such as semicircular, square, or rectangular shown by way of illustration in FIGS. 5–7. The pin 10 can also be cylindrical or of other shapes, but if cylindrical care must be taken when inserting the pin in the hole to assure that the pin is properly positioned in the hole. Preferably the cross sectional dimensions of the hole 15 are the same or slightly less than the cross sectional dimensions of the pin portion 11 so that the pin will frictionally fit within the jaw bone and resist turning or longitudinal movement relative thereto. The main body of the pin 10 is provided with a centrally located transverse bore 14 which is internally threaded to receive a threaded fastener (see FIG. 8).

The reduced ends 12, 12' of the pin 10 are provided to firmly support a drill jig 16 over the jaw bone 9 after the pin 10 is implanted in the jaw bone so that a hole can be drilled into the jaw in axial alignment with the central bore 14 in the pin. The jig 16 includes a substantially U-shaped frame having a central web portion 17 bridging the jaw bone, and a pair of legs 18 and 19 extending in the same direction from opposite ends of the web portion 17. The jig frame 16' is preferably made from noncorrosive metal strip material of such thickness and characteristics that the legs 18 and 19 can be spread apart slightly and will resiliently return to their normal position. Apertures 20 and 20' are provided in legs 18 and 19 respectively opposite each other to receive the ends 12, 12' of the pin 10 when the legs are spread apart slightly. The distance between the inside walls of the legs 18 and 19 is normally approximately equal to the length of the main body portion 11 of the pin 10 or slightly less so that the pin will be firmly gripped by the legs of the jig frame as a result of the relatively stiff resiliency of the metal strip from which the jig is made. The apertures 20, 20' are of the same shape as the reduced ends of the pin 10 only slightly larger so that the reduced ends 12, 12' can fit therein. Preferably the apertures 20, 20' in the legs 18 and 19 and the reduced ends 12, 12' are of a noncircular shape, such as rectangular, so that the pin will not rotate relative to the jig. Mounted centrally within the web portion 17 is a drill guide bushing 21 having a central hole 22 which is of a dimension adequate to snugly receive a drill 23 for drilling the required hole into the jaw bone 9 in axial alignment with the central bore 14 in the implanted pin 10.

Figure 8:
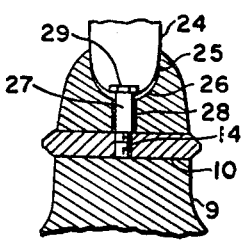
FIG. 8 is a vertical cross sectional view through the jaw showing the pin of this invention in place and a tooth anchored to the jaw by means of the pin and fastener.
Figure 10:
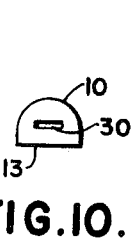
FIG. 10 is an end view of the anchor pin shown in FIG. 9.

In FIG. 8 of the drawing, the use of the pin 10 for anchoring a tooth 24 to the jaw bone 9 is illustrated. The tooth 24 as shown is supported by a noncorrosive cup member 25 shaped to be received in the natural socket 26 for a tooth which has been extracted from the jaw bone. A screw threaded fastener 27 is rigidly secured to the bottom of the cup member 25 by means of a headed portion 29. The fastener 27 is adapted to be inserted into a hole 28 drilled into the jaw bone and threadedly engaged within the central bore 14 formed in pin 10 so as to firmly draw the tooth 24 and cup member 25 into the tooth socket 26.

While I have illustrated only one use of the pin 10, that is, for anchoring a tooth in a tooth socket of the jaw bone, it is not intended that the usefulness of the pin 10 as an anchor is so limited. It is within the scope of this invention that the pin 10 can be used to anchor numerous devices within the mouth that require a firm anchorage, and dentures, false teeth, metal roofs, orthodontic devices are but examples of the devices which can be so anchored.

In the claims the term dental appliances will be used as a generic term to include all such devices that require a firm anchorage within the mouth as named herein and other devices which can be anchored by the method and device of this invention but which are not named.

Figure 9:
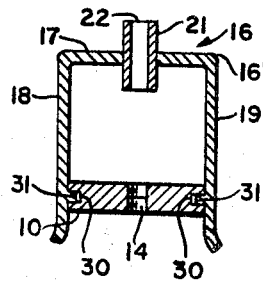
FIG. 9 is a vertical sectional view through a modified form of the anchor pin and jig.

Further it is within the scope of this invention that the means for locating and attaching the pin 10 relative to the jig 16 can be of various forms. Not only can the end portions 12, 12' of the pin 10 and the apertures 20, 20' be of various configurations such as round, square, hexagonal and other shapes, but the ends of the main body portion 11 of pin 10 may have sockets 30 (see FIG. 9) of various shapes to receive similarly shaped projections 31 extending from the inner faces of the legs 18 and 19. By spreading the legs 18 and 19 apart the projections can be snapped into the sockets in opposite ends of the anchor pin 10 to hold the jig 16 fixed relative to the anchor pin 10 with the drill guide bushing 21 positioned over the transverse bore 14.

The transverse bore 14 in the anchor pin 10 can be positioned other than at a central location within the main body portion 11 if desired. It would then be necessary to alter the drill jig 16 so that when it is attached to the ends of the pin 10 the drill guide bushing 21 would be located in axial alignment with the transverse bore 14 and bridging the jaw bone. The alteration required would be the shifting of the position of the guide bushing 21 in the jig frame.

It is further within the scope of this invention that multiple transverse bores may be provided in the anchor pin 10 for receiving multiple dental appliance fasteners and that the jig 16 could have a corresponding number of guide bushings 17 for the purpose of guiding a drill in axial alignment with the bores in the anchor pin 10.

The screw threaded fastener 27 shown in FIG. 8 may be long enough to pass through the bore 14 into the bone 9 on the opposite side of pin 10 for a more rigid joint if desired, or it may end within the bore in which case the bore 14 would not need to be extended entirely through the pin. Also the head portion 29 of the fastener 27 could extend at a higher level and be either round, square, hexagonal or other configurations. The fastener 27 could be made of metal, plastic, ceramic or of a combination of materials.

The method of attaching the dental appliance once the position for attachment to the jaw bone has been selected is to form a first hole 15 transveresly through the jaw bone at the selected location by drilling or other suitable cutting methods. The first hole can be formed in the alveolar bone or in the firm cortical bone of the jaw. While the flesh covering the bone at the position where the hole 15 is to be drilled can be incised and spread apart prior to forming the hole, no incision is necessary. After forming the hole 15 an anchor pin 10 having a main body portion 11 which is of a length approximately equal to the length of the hole 15 is selected and is inserted and longitudinally centered in the hole 15. If the hole 15 is round and the pin 10 is round, care will need to be taken to properly align the pin 10 in the hole 15 so that the transverse bore 14 in the pin 10 extends in the proper direction. If the hole 15 and the pin 10 are other than round, such as square, the pin can be inserted with the bore 14 pointing in the proper direction and once inserted the pin will not change position. After the pin 10 is implanted in the jaw, a drilling jig 16 having a drill guide bushing 21 and a support frame is attached to the ends of the anchor pin with the drill guide bushing bridging the jaw bone in axial alignment with the transverse bore of the anchor pin 10. Once the drill jig is in place a second hole 28 is drilled into the jaw in axial alignment with the transverse bore 14 of the anchor pin with the drill being guided by the drill guide bushing 21. A fastener 27 with a dental appliance such as an artifical tooth 24 attached thereto is inserted through the second hole 28 and secured in the transverse bore 14 of the anchor pin 10.

I claim:

1. An anchor pin adapted to be inserted in a transverse hole drilled through the jaw bone in the mouth of a user for attaching dental appliances to the jaw bone, said anchor pin having at least a main body portion of substantially uniform cross sectional shape, and a transverse bore through said main body portion for receiving a fastener supporting a dental appliance inserted in said jaw bone through a hole drilled in axial alignment with said bore into the jaw bone, said main body portion being of a length approximately equal to the transverse hole in which it is to be inserted, and being of a cross sectional shape having at least one flat side for preventing rotation of said anchor pin in a similarly shaped hole, and end bearing portions integrally formed on opposite ends of said main body portion for supporting the frame of a detachable drill jig in a fixed relationship thereto, said drill jig being adapted to bridge the jaw bone and be supported by the opposite ends of said pin and support a drill bushing in axial alignment with said transverse bore.

2. The anchor pin set forth in claim 1 wherein said end bearing portions have at least one flat bearing surface.

3. The anchor pin set forth in claim 1 having multiple transverse bores for receiving multiple fasteners.

4. The anchor pin set forth in claim 1 wherein said main body portion has sockets formed in opposite ends thereof.

5. A method for attaching dental appliances to the jaw bone of a user comprising the steps of forming a first hole transversely through the jaw bone of a user, inserting an anchor pin having a transverse bore therein in said first hole so that said pin is longitudinally centered in said hole, forming a second hole in the jaw bone in axial alignment with the transverse bore in said anchor pin, inserting a fastener having a dental appliance secured to one end thereof through said second hole, and securing said fastener in said transverse bore.

6. The method set forth in claim 5 wherein said first hole is formed through the alveolar bone of the jaw.

7. The method set forth in claim 5 wherein said first hole is formed through the cortical bone of the jaw.

8. The method set forth in claim 5 wherein the step of forming a second hole in the jaw bone in axial alignment with the transverse bore in said anchor pin includes attaching a drill jig having a generally U-shaped frame and drill guide bushing centered in said frame to the ends of said anchor pin with the drill guide bushing bridging said jaw bone in axial alignment with the transverse bore of said anchor pin and drilling said second hole into the jaw with the drill being guided by the drill guide bushing.

9. The apparatus in combination comprising an anchor pin having a transverse bore therein adapted to be secured in a first hole formed transversely through the jaw bone of a human for securing dental appliances to the jaw bone, and a drill jig having a drill guide bushing and support frame adapted to be attached to the ends of said anchor pin when the anchor pin is longitudinally centered in said first hole for guiding a drill in drilling a second hole through the jaw bone in axial alignment with said transverse bore, said anchor pin having a main body portion of a length approximately equal to the length of said first hole and end bearing means formed on opposite ends of said main body portion, and support means on said drill jig frame for engaging said end bearing means of said anchor pin and holding said drill jig in fixed relationship thereto with the drill guide bushing located over said jaw bone in axial alignment with the transverse bore in said anchor pin.

10. The apparatus set forth in claim 9 wherein said end bearing means are projecting bearing portions extending from opposite ends of said main body portion, and wherein said drill jig frame has a pair of spaced legs connected by an intermediate portion in which said drill guide bushing is located, and said support means on said drill jig frame are apertures in each of said legs of a size and shape that will snugly fit over said projecting bearing portions of said anchor pin, said legs being normally spaced apart at their free ends by a distance approximately equal to the length of the main body portions of said anchor pin and said legs having sufficient resiliency so that the free ends of said legs can be spread apart for a distance at least equal to the full length of said anchor pin so that the apertures in said legs can be snapped over the end bearing portions of said anchor pin.

11. The apparatus set forth in claim 10 wherein said apertures and said end bearing portions are similarly shaped and have at least one flat side to prevent rotation of said end bearing portions in said apertures.

12. The apparatus set forth in claim 9 wherein said end bearing means are sockets formed in the opposite ends of said main body portion, and wherein said drill jig frame has a pair of spaced legs connected by an intermediate portion in which said drill guide bushing is located, and said support means on said drill jig frame are projections extending inwardly from said legs of a size and shape to fit snugly in said sockets of said anchor pin, said legs being normally spaced apart at their free ends by a distance approximately equal to the length of the main body portion of said anchor pin and said legs having sufficient resiliency so that the free ends of said legs may be spread apart for a distance enough to permit the projections on said legs to be snapped into said sockets.

References Cited

UNITED STATES PATENTS

| 2,467,163 | 4/1949 | Skinner | 32—2 |
| 2,745,180 | 5/1956 | Kiernan | 32—10 |
| 2,857,670 | 10/1958 | Kiernan | 32—10 |

ROBERT PESHOCK, *Primary Examiner.*

U.S. Cl. X.R.

32—40; 77—62